United States Patent
Pandey et al.

(10) Patent No.: US 10,860,604 B1
(45) Date of Patent: Dec. 8, 2020

(54) SCALABLE TRACKING FOR DATABASE UDPATES ACCORDING TO A SECONDARY INDEX

(71) Applicant: Amazon Technologies, Inc., Reno, NV (US)

(72) Inventors: Prashant Pandey, Pleasanton, CA (US); Benjamin Aldouby Schwartz, East Palo Alto, CA (US); Swaminathan Sivasubramanian, Sammamish, WA (US); Khawaja Salman Shams, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1130 days.

(21) Appl. No.: 14/566,447

(22) Filed: Dec. 10, 2014

(51) Int. Cl.
*G06F 16/27* (2019.01)
*G06F 11/14* (2006.01)
*G06F 16/22* (2019.01)
*G06F 16/23* (2019.01)

(52) U.S. Cl.
CPC .......... *G06F 16/27* (2019.01); *G06F 11/1412* (2013.01); *G06F 16/22* (2019.01); *G06F 16/23* (2019.01)

(58) Field of Classification Search
CPC ........................... G06F 17/30286; G06F 17/27
See application file for complete search history.

(56) References Cited

U.S. PATENT DOCUMENTS

| | | | | |
|---|---|---|---|---|
| 5,806,075 A * | 9/1998 | Jain | ......................... | G06F 16/27 |
| 6,226,650 B1 | 5/2001 | Mahajan et al. | | |
| 7,356,550 B1 * | 4/2008 | Lin | ....................... | G06F 16/275 |
| 7,657,574 B2 | 2/2010 | Gupta et al. | | |
| 8,554,724 B2 | 10/2013 | Zunger | | |
| 2005/0033777 A1 * | 2/2005 | Moraes | ................... | G06F 16/27 |
| 2005/0240531 A1 * | 10/2005 | Wolff, Jr. | ............. | G06Q 20/382 |
| | | | | 705/53 |
| 2006/0271510 A1 * | 11/2006 | Harward | ................... | G06F 9/52 |
| 2010/0132024 A1 * | 5/2010 | Ben-Natan | .............. | G06F 9/545 |
| | | | | 726/9 |

(Continued)

OTHER PUBLICATIONS

U.S. Appl. No. 15/625,976, filed Jun. 16, 2017, Sharatkumar Nagesh Kuppahally et al.

*Primary Examiner* — Etienne P Leroux
*Assistant Examiner* — Farhad Agharahimi
(74) *Attorney, Agent, or Firm* — Robert C. Kowert; Kowert, Hood, Munyon, Rankin & Goetzel, P.C.

(57) ABSTRACT

A database client may implement scalable tracking for database updates according to a secondary index. As update requests are generated and sent to a database, tracking attributes may be included in the update requests in order to be inserted into the database with respect to a portion of the database for which the requested update is performed. Tracking attributes may include a sequence number which may be used to determine an order in which the updates are performed at the database. Tracking attributes may also include a bucket identifier, which may categorize or label the portion of data updated as part of an update. These tracking attributes may be replicated to a secondary index maintained for the database. Queries to the secondary index based on the tracking attributes may identify updates performed to the database. Notifications of the identified updates may then be provided.

20 Claims, 9 Drawing Sheets

(56) References Cited

U.S. PATENT DOCUMENTS

| | | | |
|---|---|---|---|
| 2010/0318795 A1* | 12/2010 | Haddad | H04W 12/06 |
| | | | 713/168 |
| 2011/0113117 A1* | 5/2011 | Genest | G06F 11/3476 |
| | | | 709/217 |
| 2012/0096046 A1* | 4/2012 | Kucera | G06Q 30/01 |
| | | | 707/802 |
| 2012/0310878 A1 | 12/2012 | Vuksan et al. | |
| 2013/0238556 A1 | 9/2013 | Mielenhausen | |
| 2014/0258226 A1 | 9/2014 | Noteboom | |
| 2014/0279855 A1* | 9/2014 | Tan | G06F 16/2228 |
| | | | 707/609 |
| 2015/0268890 A1 | 9/2015 | Stefani et al. | |
| 2016/0132581 A1 | 5/2016 | Hsieh et al. | |

\* cited by examiner

| Primary Key | Attribute | Attribute | ... | Bucket Identifier | Sequence number | |
|---|---|---|---|---|---|---|
| 12345 | ... | ... | ... | bucket B | 10007 | database table 122 |
| 12346 | ... | ... | ... | bucket C | 10005 | |
| 12347 | ... | ... | ... | bucket A | 10003 | |
| 12348 | ... | ... | ... | bucket B | 10001 | |
| 12349 | ... | ... | ... | bucket A | 10002 | |
| 12350 | ... | ... | ... | bucket D | 10004 | |
| 12351 | ... | ... | ... | bucket B | 10006 | |

| Bucket Identifier | Sequence number | Primary Key | Projected Attribute | ... | |
|---|---|---|---|---|---|
| bucket B | 10001 | 12348 | ... | ... | secondary table index 124 |
| bucket A | 10002 | 12349 | ... | ... | |
| bucket A | 10003 | 12347 | ... | ... | |
| bucket D | 10004 | 12350 | ... | ... | |
| bucket C | 10005 | 12346 | ... | ... | |
| bucket B | 10006 | 12351 | ... | ... | |
| bucket B | 10007 | 12345 | ... | ... | |

SCALABLE TRACKING FOR DATABASE UDPATES ACCORDING TO A SECONDARY INDEX

BACKGROUND

Numerous business applications are being migrated to "cloud" environments in recent years. Data centers housing significant numbers of interconnected computing systems for cloud-based computing have become commonplace, such as private data centers that are operated by and on behalf of a single organization, and public data centers that are operated by entities as businesses to provide computing resources to customers. In addition to core computing resources, operators of some public data centers implement a variety of advanced network-accessible services, including, for example, distributed database services, object storage services and the like. Such storage-related services typically support very high levels of scalability, data durability and availability. By using the resources of public provider networks, clients can scale their applications up and down as needed, often at much lower costs that would have been required if the required computing infrastructure had to be set up on client-owned premises. Using virtualization techniques, provider network operators may often use a given hardware server on behalf of many different clients, while maintaining high service quality levels for each of the clients. Sharing resources via such virtualization-based multi-tenancy may enable the provider network operators to increase hardware utilization levels, matching resource demand with supply more efficiently and keeping costs low.

As the costs of computing and data storage fall with the increased use of virtualization and cloud computing, new applications for data analysis are becoming more cost-effective. Many database services implemented at provider networks support very high volumes of updates, leading to data sets that may have to be distributed across tens or hundreds of physical storage devices, sometimes spread across multiple data centers. The database services may expose APIs (application programming interfaces) for reads and writes (e.g., creates/inserts, deletes, and updates of database records), which enable clients to easily change the contents of data objects such as tables and view the current version of the contents. However, while the interfaces provided by the database services may enable clients to access the data objects, and thus the cumulative impact of all the changes that have been performed, it may not be straightforward for clients to determine the sequence in which various changes were applied to the data or groups of data which were changed. Information about the changes that are performed on tables and other data objects may be useful for a number of applications such as offline data mining to identify trends, selective checkpointing of relevant subsets of data at remote sites, and so on. Furthermore, at high volume data stores that are intended to handle hundreds of thousands (or even millions) of modifications per second, extracting information about the operations being performed without impacting incoming client requests may present a challenge.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Systems and methods described herein may be employed in various combinations and in various embodiments to scalable tracking of database updates according to a secondary index. In various database system architectures, determining the updates that are performed to a given database may be costly in terms of computing resources. For example, distributed database systems which are sharded may be difficult to track updates (as updates may be performed at different shards that may be distributed across different nodes in the distributed database system). However, identifying database updates may provide for further analysis, operation, and/or optimization of database systems. For example, updates to a database that are identified may be replayed to a replica of a database that is unavailable to receive updates directly from the database. Therefore, tracking updates to a database in a manner that scales with the size and/or architecture of a database (such as the sharded database described above) may obtain information about performed updates without burdening the functioning and/or cost of the database.

Figures 1A, 1B:
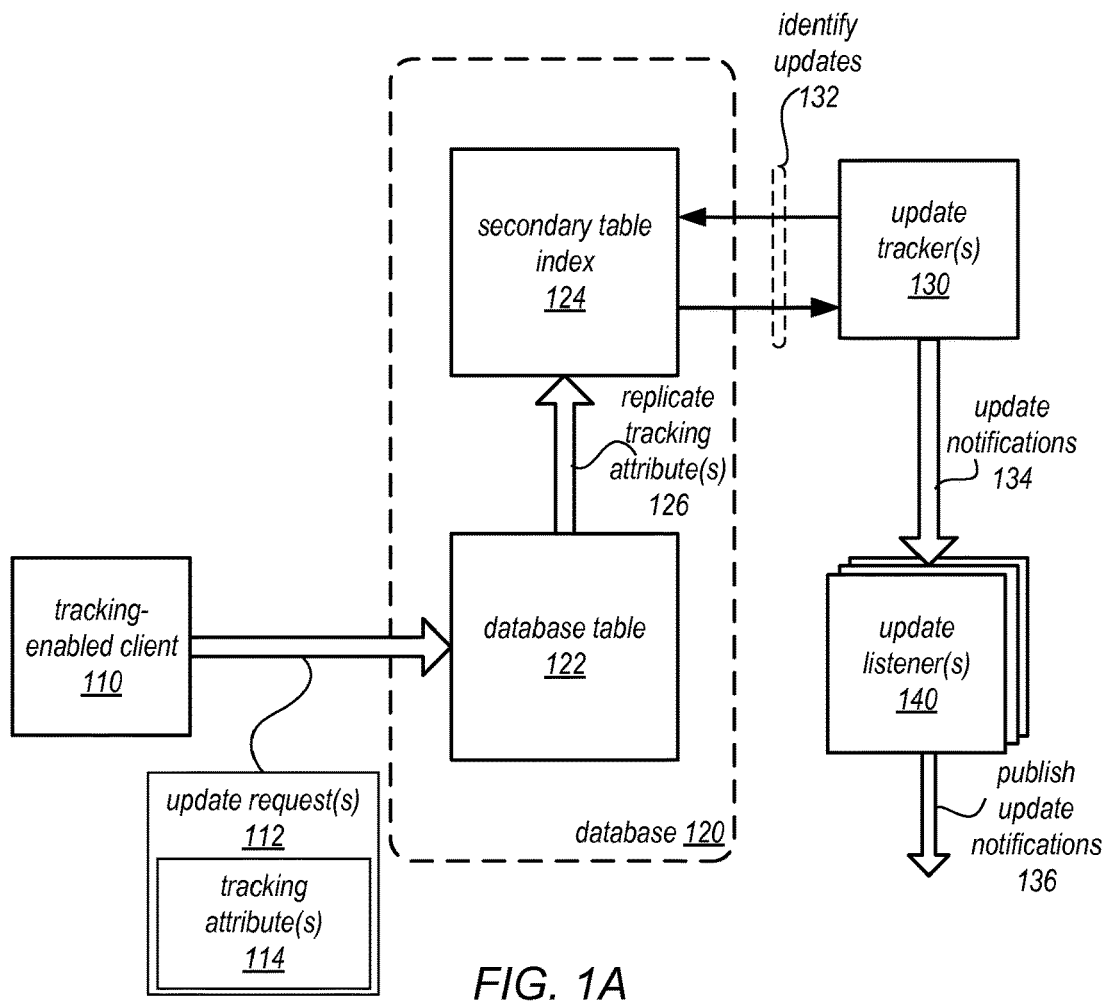
FIG. 1A is a block diagram illustrating scalable tracking of database updates according to a secondary index, according to some embodiments.
FIG. 1B is a diagram illustrating an example database table and secondary index table generated from tracking attributes, according to some embodiments.

FIG. 1A is a block diagram illustrating scalable tracking of database updates according to a secondary index, according to some embodiments. Database 120 may be any kind of database (e.g., relational or non-relational), or structured data store, which may be configured to implement a secondary table index based on a database table. A secondary table index may be a table of attributes, or data that is projected from a master or base database table that may be indexed (e.g., reordered or keyed) on different values to provide an efficient search for data according to those different values. As illustrated in FIG. 1A, database 120 implements a database table 122 and maintains a secondary table index 124.

FIG. 1B is a diagram illustrating an example database table and secondary index table generated from tracking attributes, according to some embodiments. In database table 122, a primary key value is illustrated, along with multiple other attributes. As illustrated in FIG. 1A, tracking attributes, such as a bucket identifier and sequence number may be inserted along with updates to particular portions of data (e.g., bucket identifier and sequence number in database table 122). These tracking attributes may be indexed as part of the secondary table index 124 in order to provide access to updates identified by the tracking attributes. For example, a bucket identifier may identify a group or collection of data that is updated, whereas a sequence identifier may provide an ordering of the performance of updates. Thus, queries upon secondary table index 124 according to tracking attributes, such as a bucket identifier and/or a sequence number, may be able to identify updates to specific buckets, and the order in which the updates are received.

Thus, as illustrated in FIG. 1A, a tracking-enabled client 110 may be configured to send update requests 112 to database 120 to update portions of database table 122. Tracking-enabled client 110 may insert tracking attribute(s) 114 (which may be bucket identifiers, sequence numbers, nonces, or any other attribute which may provide for more efficient tracking of updates, such as tombstone records included to mark portions of data for soft deletes). Database 120 may replicate tracking attribute(s) 126, along with other projected attributes, to secondary index table 124. Update tracker(s) 130 may be configured to query secondary index table 124 to identify updates that have been made according to the tracking attributes included in secondary index table 124. Update tracker(s) 130 may then provide update notifications 134 to update listener(s) 140. Update listener(s) 140 may then be configured to publish update notifications 136 to different respective update consumers (e.g., in order to perform various actions based on the update notifications, storing the updates, triggering events, placing the updates in an update stream, and/or analyzing the updates).

Please note that FIG. 1 is provided as a logical illustration of scalable tracking of database updates according to a secondary index, and thus is not intended to be limiting. Various types of databases (e.g., relational or non-relational), secondary table indexes, update trackers, tracking-enabled clients may be implemented (in the same or different configurations). Moreover, in some embodiments, update trackers, update listeners, and/or tracking-enabled clients may be implemented together in different combinations.

This specification begins with a general description of a non-relational database service implemented by a provider network, which may provide scalable tracking of database updates according to a secondary index. Then various examples of a database service and database tracking are discussed, including different components/modules, or arrangements of components/module that may be employed as part of implementing a database service and clients, update trackers, and update listeners. Various interactions between a database service and clients, update trackers, and update listeners, as well as other systems, such as an update consumer, are described, as well as the various configurations of application clients that may utilize scalable tracking for database updates. A number of different methods and techniques to implement scalable tracking of database updates according to a secondary index are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
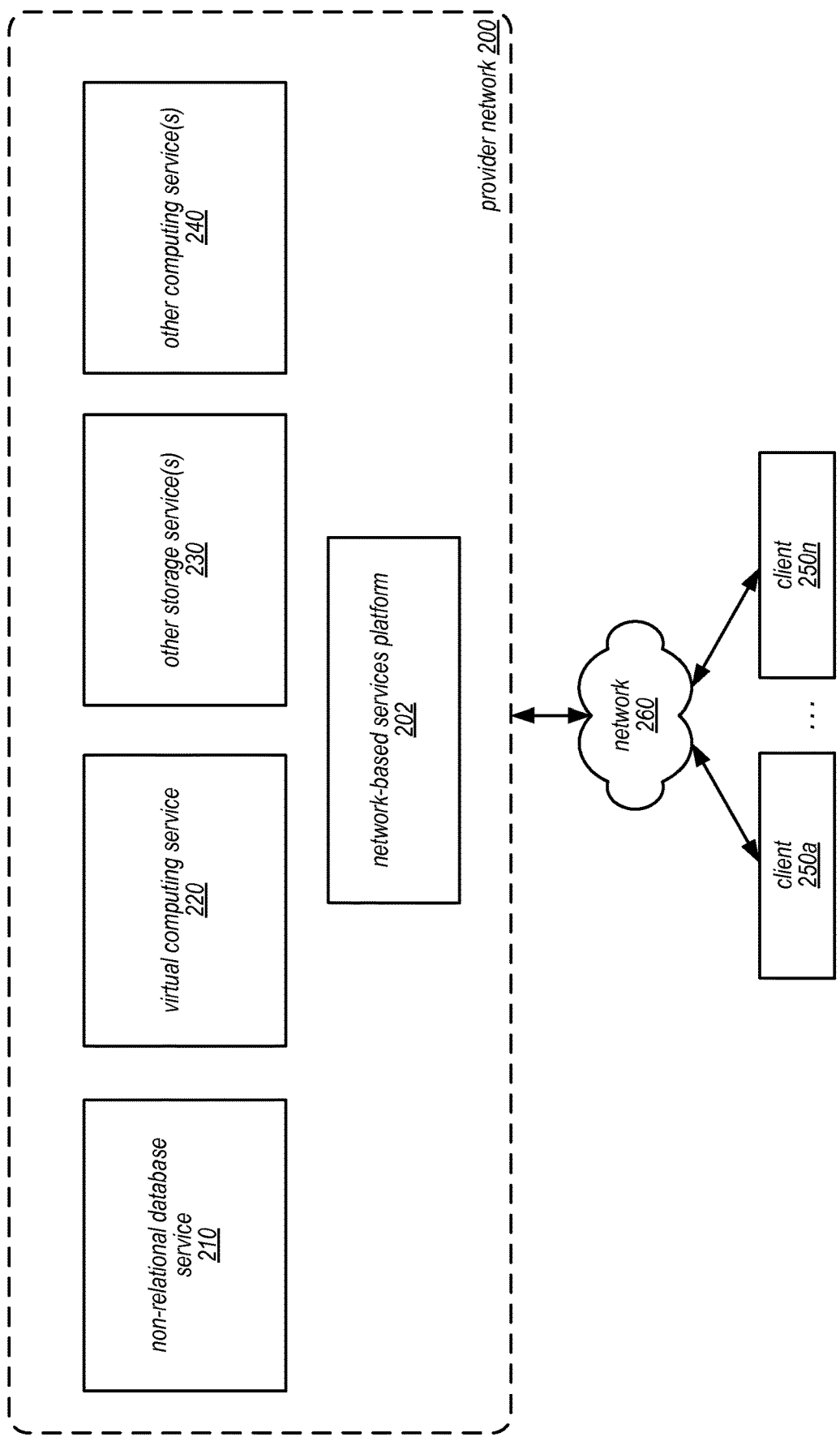
FIG. 2 is a block diagram illustrating an example provider network, according to some embodiments.

FIG. 2 is a block diagram illustrating an example provider network, according to some embodiments. In the illustrated embodiment, a number of clients (shown as clients 250a-250n) may be configured to interact with a network-based services platform 202 via a network 260 implemented as part of provider network 200. Provider network 200 may be set up by an entity such as a company or a public sector organization to provide one or more services (such as various types of cloud-based computing or storage) accessible via the Internet and/or other networks to clients 250. Provider network 200 may include numerous data centers hosting various resource pools, such as collections of physical and/or virtualized computer servers, storage devices, networking equipment and the like (e.g., computing system 1000 described below with regard to FIG. 9), needed to implement and distribute the infrastructure and services offered by the provider network 200. Network-based services platform 202 may be an configured to interface with non-relational database service 210, a virtual computing service 220, an object storage service 230 and/or one or more other virtual computing services, such as other computing service(s) 240. It is noted that where one or more instances of a given component may exist, reference to that component herein may be made in either the singular or the plural. However, usage of either form is not intended to preclude the other.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment 1000 illustrated in FIG. 9 and described below. In various embodiments, the functionality of a given service system component (e.g., a component of the object-backed block-based storage service, non-relational database service, object storage service or virtual computing service) may be implemented by a particular node or may be distributed across several nodes. In some embodiments, a given node may implement the functionality of more than one service system component (e.g., more than one object-backed block-based storage service system component).

Generally speaking, clients 250 may encompass any type of client configurable to submit network-based services requests to network-based services platform 202 via network 260, including requests for database services (e.g., a request to generate a snapshot, etc.). In at least some embodiments, clients 250 may be a tracking-enabled client, and may encompass an operating system or application such as a media application, an office application or any other application that may make use of a database in non-relational database service 210. However, some requests may also be made according various different kinds of other network-based protocols. For example, a given client 250 may include a suitable version of a web browser, or may include a plug-in module or other type of code module configured to execute as an extension to or within an execution environment provided by a web browser. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application configured to interact directly with network-based services platform 200. In some embodiments, client 250 may be configured to generate network-based services requests according to a Representational State Transfer (REST)-style network-based services architecture, a document- or message-based network-based services architecture, or another suitable network-based services architecture.

In some embodiments, a client 250 (e.g., a non-relational database service 210 client) may be configured to provide access to a non-relational database service 210 to other applications in a manner that is transparent to those applications. For example, client 250 may be configured to integrate with an operating system or file system to provide block-based storage in accordance with a conventional storage device interface (e.g., small computer interface (SCSI)). In such an embodiment, applications may not need to be modified to make use of a non-relational database service 210. Instead, the details of interfacing to network-based services platform 202 or a non-relational database service 210 client may be coordinated by client 250 and the operating system or file system on behalf of applications executing within the operating system environment according to a network-based storage protocol.

Clients 250 may convey network-based services requests (e.g., requests to update a database which may include tracking attributes, queries to a secondary index of a database) to and receive responses from network-based services platform 202 (or directly to non-relational database service 210, virtual computing service 220, object storage service 230 or other computing service(s) 240) via network 260. In various embodiments, network 260 may encompass any suitable combination of networking hardware and protocols necessary to establish network-based-based communications between clients 250 and platform 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and network-based services platform 202 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and network-based services platform 202. It is noted that in some embodiments, clients 250 may communicate with network-based services platform 202 using a private network rather than the public Internet.

Generally speaking, network-based services platform 202 may be configured to implement one or more service endpoints configured to receive and process network-based services requests, such as requests to allocate virtual block storage. For example, network-based services platform 202 may include hardware and/or software configured to implement a particular endpoint, such that an HTTP-based network-based services request directed to that endpoint is properly received and processed. In one embodiment, network-based services platform 202 may be implemented as a server system configured to receive network-based services requests from clients 250 and to forward them to components of a system that implements a non-relational database service 210 for processing. In other embodiments, network-based services platform 202 may be configured as a number of distinct systems (e.g., in a cluster topology) implementing load balancing and other request management features configured to dynamically manage large-scale network-based services request processing loads. In various embodiments, network-based services platform 202 may be configured to support REST-style or document-based (e.g., SOAP-based) types of network-based services requests.

In addition to functioning as an addressable endpoint for clients' network-based services requests, in some embodiments, network-based services platform 202 may implement various client management features. For example, platform 202 may coordinate the metering and accounting of client usage of network-based services, including storage resources, such as by tracking the identities of requesting clients 250, the number and/or frequency of client requests, the size of data tables (or records thereof) stored or retrieved on behalf of clients 250, overall storage bandwidth used by clients 250, class of storage requested by clients 250, or any other measurable client usage parameter. Platform 202 may also implement financial accounting and billing systems, or may maintain a database of usage data that may be queried and processed by external systems for reporting and billing of client usage activity. In certain embodiments, platform 202 may be configured to collect, monitor and/or aggregate a variety of storage service system operational metrics, such as metrics reflecting the rates and types of requests received from clients 250, bandwidth utilized by such requests, system processing latency for such requests, system component utilization (e.g., network bandwidth and/or storage utilization within the storage service system), rates and types of errors resulting from requests, characteristics of stored and requested data pages or records thereof (e.g., size, data type, etc.), or any other suitable metrics. In some embodiments such metrics may be used by system administrators to tune and maintain system components, while in other embodiments such metrics (or relevant portions of such metrics) may be exposed to clients 250 to enable such clients to monitor their usage of non-relational database service 210 (or the underlying systems that implement those services, such as virtual computing service 220 or object storage service 230).

In some embodiments, network-based services platform 202 may also implement user authentication and access control procedures. For example, for a given network-based services request to create or modify a particular database, platform 202 may be configured to ascertain whether the client 250 associated with the request is authorized to create or modify the particular data volume. Platform 202 may determine such authorization by, for example, evaluating an identity, password or other credential against credentials associated with the particular database, or evaluating the requested access to the particular database against an access control list for the particular database. For example, if a client 250 does not have sufficient credentials to create or modify the particular data volume, platform 202 may reject the corresponding network-based services request, for example by returning a response to the requesting client 250 indicating an error condition. Various access control policies may be stored as records or lists of access control information by non-relational database service 210.

It is noted that while network-based services platform 202 may represent an interface through which clients 250 may access some features of non-relational database service 210, it need not represent the sole interface to such features. In at least some embodiments, virtual computing service 220 may implement virtual compute instances that implement tracking-enabled clients, update trackers, update listeners, and/or update consumers, as opposed to clients external 250 from provider network 200. For example, virtual compute service 220 may offer various compute instances to clients 250. A virtual compute instance may, for example, comprise one or more servers with a specified computational capacity (which may be specified by indicating the type and number of CPUs, the main memory size, and so on) and a specified software stack (e.g., a particular version of a tracking-enabled client, update tracker, update listener, and an operating system, which may in turn run on top of a hypervisor). A number of different types of computing devices may be used singly or in combination to implement the compute instances of virtual compute service 220 in different embodiments, including general purpose or special purpose computer servers, storage devices, network devices and the like. In some embodiments instance clients 250 or other any other user may be configured (and/or authorized) to act as an update tracker for changes made to a database in non-relational database service 210, including sending queries to non-relational database service 210 for the secondary table index.

Figure 3:
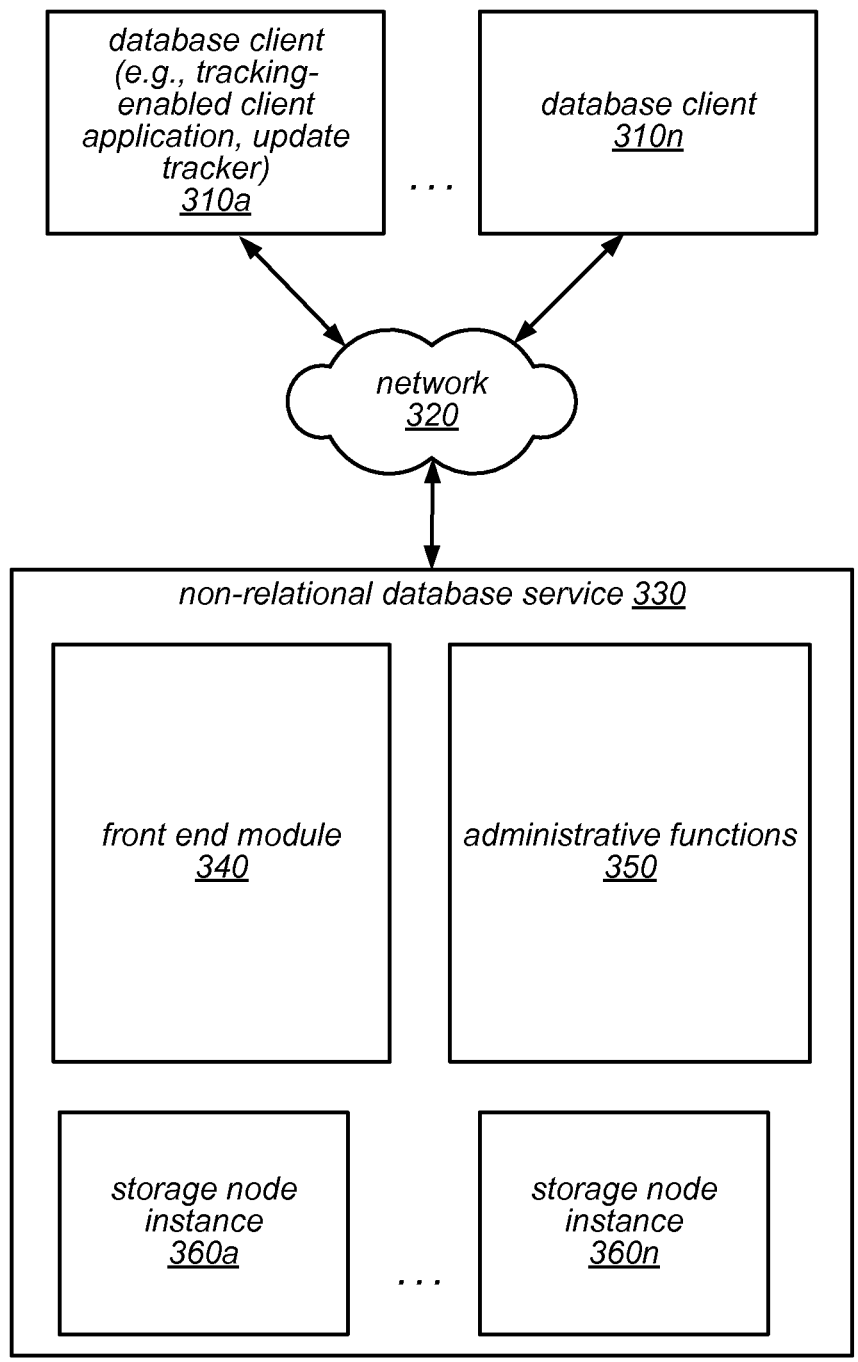
FIG. 3 is a block diagram illustrating a database service, according to some embodiments.

Database service 210 is illustrated in FIG. 2 as implemented as part of network-based services platform 200. However, a database system or structured data store service implementing secondary table indexes may also be implemented independently of the network-based services platform. FIG. 3 is a block diagram illustrating a database service, according to some embodiments, which may be implemented either as part of a network-based services platform or as a standalone service. While the database service discussed with regard to FIG. 3 is given to be a non-relational database servicer, similar architectures or schemas may be implemented to provide a relational database (or otherwise structured service), and thus the following description is not intended to be limiting as to the type of database for which scalable tracking of updates may be provided. It is noted that where one or more instances of a given component may exist, reference to that component herein below may be made in either the singular or the plural. However, usage of either form is not intended to preclude the other. In various embodiments, the components illustrated in FIG. 3 may be implemented directly within computer hardware, as instructions directly or indirectly executable by computer hardware (e.g., a microprocessor or computer system), or using a combination of these techniques. For example, the components of FIG. 3 may be implemented by a distributed system including a number of computing nodes (or simply, nodes), such as computing system 1000 in FIG. 9 described below. In various embodiments, the functionality of a given computing system component may be implemented by a particular computing node or may be distributed across several computing nodes. In some embodiments, a given computing node may implement the functionality of more than one database service system component.

Generally speaking, database clients 310a-310n may encompass any type of client configurable to submit web services requests to non-relational database service 330 via network 320, such as application provider(s) 220 or application client(s) 230 described above. For example, a given database client 310 may include a suitable version of a web browser, or a plug-in module or other type of code module configured to execute as an extension to or within an execution environment provided by a web browser to provide database or data storage service clients (e.g., client applications, users, and/or subscribers) access to the services provided by non-relational 330. Alternatively, a database client 310 may encompass an application such as a database application, media application, office application or any other application that may make use of persistent storage resources (such as application provider(s) 220 and application client(s) 230). For example, a database client 310 may be a tracking-enabled client, configured to request updates to a database maintained in in non-relational database service 330, or an update tracker configured to query information from a secondary index of database table generated from tracking attributes. In some embodiments, such an application may include sufficient protocol support (e.g., for a suitable version of Hypertext Transfer Protocol (HTTP)) for generating and processing web services requests without necessarily implementing full browser support for all types of web-based data. That is, database client 310 may be an application configured to interact directly with non-relational database service 330. In various embodiments, database client 310 may be configured to generate web services requests according to a Representational State Transfer (REST)-style web services architecture, a document- or message-based web services architecture, or another suitable web services architecture.

Database clients 310 may convey web services requests to and receive responses from non-relational database service 330 via network 320. Similar to network 260 described above, in various embodiments, network 320 may encompass any suitable combination of networking hardware and protocols necessary to establish web-based communications between clients 310 and network-based storage service 330. For example, network 320 may generally encompass the various telecommunications networks and service providers that collectively implement the Internet. Network 320 may also include private networks such as local area networks (LANs) or wide area networks (WANs) as well as public or private wireless networks. For example, both a given database client 310 and non-relational database service 330 may be respectively provisioned within enterprises having their own internal networks. In such an embodiment, network 320 may include the hardware (e.g., modems, routers, switches, load balancers, proxy servers, etc.) and software (e.g., protocol stacks, accounting software, firewall/security software, etc.) necessary to establish a networking link between given database client 310, delegation service 370, and the Internet as well as between the Internet and network-based storage service 330, and delegation service 370. It is noted that in some embodiments, database clients 310 may communicate with non-relational database service 330 using a private network rather than the public Internet. For example, clients 310 may be provisioned within the same enterprise as the data storage service (and/or the underlying system) described herein. In such a case, clients 310 may communicate with non-relational database service 330 entirely through a private network 320 (e.g., a LAN or WAN that may use Internet-based communication protocols but which is not publicly accessible).

Generally speaking, non-relational database service 330 may be configured to implement one or more service endpoints configured to receive and process web services requests, such as requests to access tables maintained on behalf of application providers and application clients by a database service or a data storage service, and/or the items and attributes stored in those tables. For example, non-relational database service 330 may include hardware and/or software configured to implement various service endpoints and to properly receive and process HTTP-based web services requests directed to those endpoints. In one embodiment, non-relational database service 330 may be implemented as a server system configured to receive web services requests from clients 310 and to forward them to various components that collectively implement a database system for processing. In other embodiments, non-relational database service 330 may be configured as a number of distinct systems (e.g., in a cluster topology) implementing load balancing and other request management features configured to dynamically manage large-scale web services request processing loads.

As illustrated in FIG. 3, non-relational database service 330 may include a front end module 340 (which may be configured to receive, authenticate, parse, throttle and/or dispatch service requests, among other things). In various embodiments, front end module 340 may implement fine-grained access control manager 342. Non-relational database service 330 may also implement a component to provide administrative functions 350 (which may be configured to provide a variety of visibility and/or control functions, as described in more detail herein), and a plurality of storage node instances (shown as 360a-360n), each of which may maintain and manage one or more tables on behalf of clients/users or on behalf of the data storage service (and its underlying system) itself. Some of the functionality provided by each of these types of components is described in more detail herein, according to various embodiments. Note that in some embodiments, non-relational database service 330 may include different versions of some of the components illustrated in FIG. 3 to provide functionality for creating, accessing, and/or managing tables maintained in database instances within a single-tenant environment than those that provide functionality for creating, accessing, and/or managing tables maintained in database instances within a multi-tenant environment. In other embodiments, functionality to support both multi-tenant and single-tenant environments may be included in any or all of the components illustrated in FIG. 3. Note also that in various embodiments, one or more database instances may be implemented on each of the storage nodes 360a-360n, and each may store tables on behalf of clients. Some of these database instances may operate as if they were in a multi-tenant environment (storing data for different clients at a same storage node instance 360), and others may operate as if they were in a single-tenant environment. In some embodiments, database instances that operate as in a multi-tenant environment may be implemented on different computing nodes (or on different virtual machines executing on a single computing node) than database instances that operate as in a single-tenant environment.

Front end module 340 may include one or more modules configured to perform parsing and/or throttling of service requests, authentication and/or metering of service requests, dispatching service requests, and/or maintaining a partition map cache. In addition to these component-specific modules, front end module 340 may include components that are common to multiple types of computing nodes that collectively implement network-based services platform 200, such as a message bus and/or a dynamic configuration module. In other embodiments, more, fewer, or different elements may be included in front end module 340, or any of the elements illustrated as being included in front end module 340 may be included in another component of non-relational database service 330 or in a component configured to interact with non-relational database service 330 to provide the data storage services described herein.

Administrative functions 350 may also be implemented by non-relational database service 330. These may include one or more modules configured to provide visibility and control to system administrators, or to perform heat balancing, and/or anomaly control, and/or resource allocation. Administrative functions 350 may also include an admin console, through which system administrators may interact with key value data store (and/or the underlying system). In some embodiments, admin console may be the primary point of visibility and control for the database service (e.g., for configuration or reconfiguration by system administrators). For example, admin console may be implemented as a relatively thin client that provides display and control functionally to system administrators and/or other privileged users, and through which system status indicators, metadata, and/or operating parameters may be observed and/or updated.

Storage node instances 360 may include one or more modules configured to provide partition management, to implement replication and failover processes, and/or to provide an application programming interface (API) to underlying storage. Various different ones of administrative and/or control plane operations may be performed locally (e.g., on a given storage node instance 360) based, e.g., on one or more measures of the utilization of provisioned resources on the storage devices or logical storage volumes of the storage node instance.

As noted above, different storage nodes 360 may be implementing or maintaining resources in multiple different arrangements, some of which may be part of larger collections or groups of resources. A replica group, for example, may be composed of a number of storage nodes maintaining a replica of particular portion of data (e.g., a partition of a table) for the storage service. Moreover, different replica groups may utilize overlapping nodes, where a storage node may be a member of multiple replica groups, maintaining replicas for each of those groups whose other storage node members differ from the other replica groups. Thus if, for example replica group 1 has storage nodes A, B, and C, replica group 2 may have storage nodes B, D, and E. Besides differing groups of storage nodes, in various embodiments, storage nodes may have different relationships to other storage nodes. Continuing with the above example, for replica group 1, storage node A may be a leader node, performing special functions with regard to access requests directed toward the partition maintained by replica group 1. For replica group 2, however, storage node B may be the leader node. Therefore, a storage node's relationship to other storage nodes may be different depending on the particular grouping evaluated. These various examples of different arrangements of resources among storage nodes highlight the various different ways that control plane operations may interact with resources that are not solely devoted to one particular (though they may be) function, data replica, etc.

As illustrated in this example, each storage node instance 360 may include a storage engine, which may be configured to maintain (i.e. to store and manage) one or more tables (and associated table data) in storage (which in some embodiments may be a non-relational database) on behalf of one or more clients/users. In addition to these component-specific modules, storage node instance 360 may include components that are common to the different types of computing nodes that collectively implement non-relational database service 330, such as a message bus and/or a dynamic configuration module. In other embodiments, more, fewer, or different elements may be included in storage node instance 360, or any of the elements illustrated as being included in storage node instance 360 may be included in another component of network-based storage service 330 or in a component configured to interact with network-based storage service 330 to provide the data storage services described herein.

The systems underlying the database service described herein may store data on behalf of database service clients (e.g., client applications, users, and/or subscribers) in tables containing items that have one or more attributes. In some embodiments, the database service may present clients/users with a data model in which each table maintained on behalf of a client/user contains one or more items, and each item includes a collection of attributes, such as a key value data store. The attributes of an item may be a collection of name-value pairs, in any order. In some embodiments, each attribute in an item may have a name, a type, and a value. Some attributes may be single valued, such that the attribute name is mapped to a single value, while others may be multi-value, such that the attribute name is mapped to two or more values. In some embodiments, the name of an attribute may always be a string, but its value may be a string, number, string set, or number set. The following are all examples of attributes: "ImageID"=1, "Title"="flower", "Tags"={"flower", "jasmine", "white"}, "Ratings"={3, 4, 2}. The items may be managed by assigning each item a primary key value (which may include one or more attribute values), and this primary key value may also be used to uniquely identify the item. In some embodiments, a large number of attributes may be defined across the items in a table, but each item may contain a sparse set of these attributes (with the particular attributes specified for one item being unrelated to the attributes of another item in the same table), and all of the attributes may be optional except for the primary key attribute(s). In other words, unlike in traditional databases, the tables maintained by the data storage service (and the underlying storage system) may have no pre-defined schema other than their reliance on the primary key. Note that in some embodiments, if an attribute is included in an item, its value cannot be null or empty (e.g., attribute names and values cannot be empty strings), and, and within a single item, the names of its attributes may be unique. However, in at least some other embodiments, traditional database schemes may be employed, such as the various types of relational databases implemented using Server Query Language (SQL).

In various embodiments, non-relational database service 330 may be configured to support different types of web services requests. For example, in some embodiments, network-based storage service 330 may be configured to implement a particular web services application programming interface (API) that supports a variety of operations on tables (or other data objects) that are maintained and managed on behalf of clients/users by the data storage service system (and/or data stored in those tables). Examples of the operations supported by such an API are described in more detail herein.

In various embodiments, the data storage service described herein may provide an application programming interface (API) that includes support for some or all of the following operations on the data in a table maintained by the service on behalf of a storage client: put (or store) an item, get (or retrieve) one or more items having a specified primary key, delete an item, update the attributes in a single item, query for items using an index, and scan (e.g., list items) over the whole table, optionally filtering the items returned. The amount of work required to satisfy service requests that specify these operations may vary depending on the particular operation specified and/or the amount of data that is accessed and/or transferred between the storage system and the client in order to satisfy the request.

Figure 4:
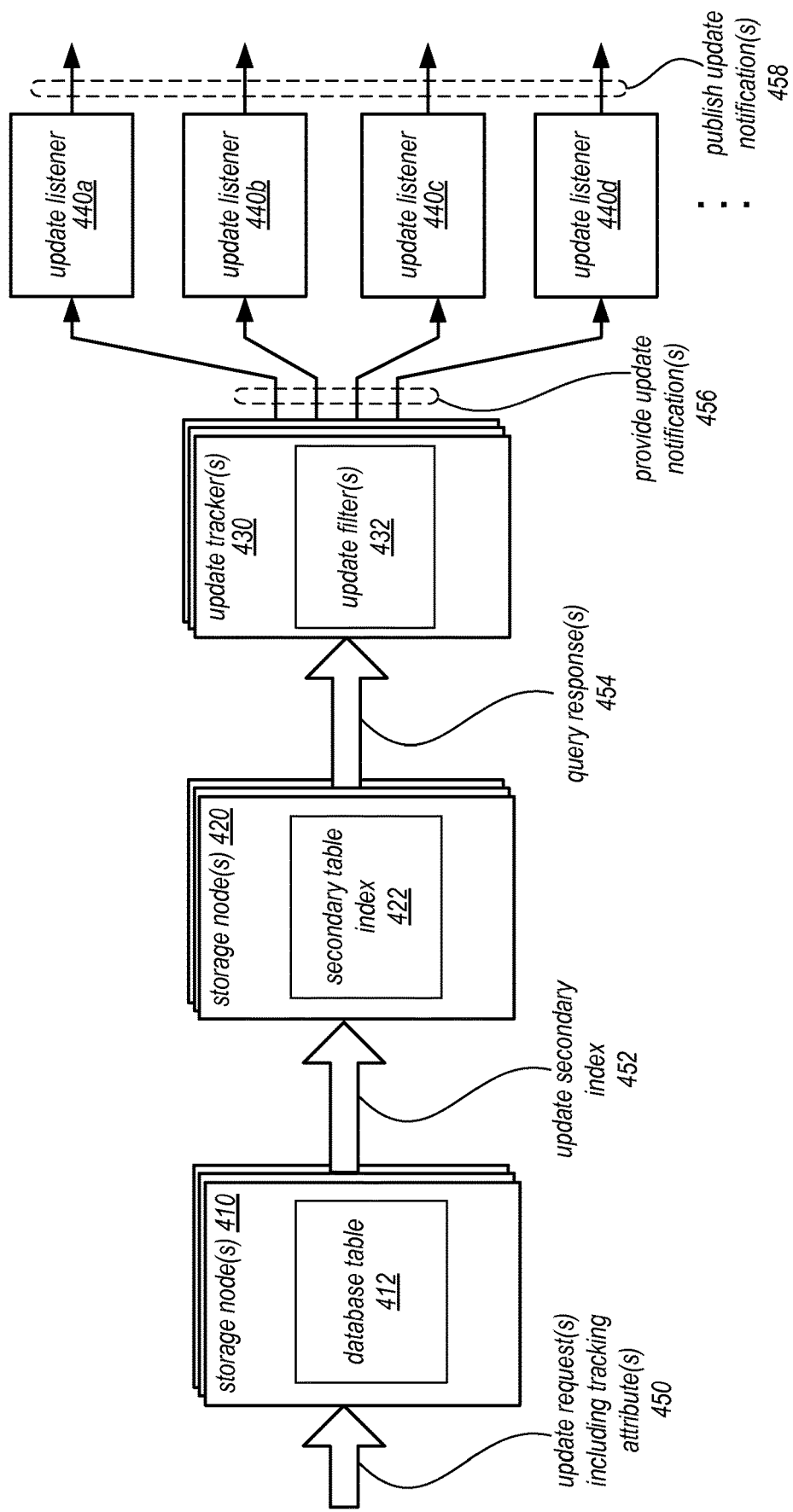
FIG. 4 is a block diagram illustrating a logical data flow of database updates, according to some embodiments.

Update notifications for updates to a database data may be propagated in various ways. FIG. 4 is a block diagram illustrating a logical data flow of database updates, according to some embodiments. Update tracker(s) 440, update listener(s) 440, and update consumers may be implemented on various hardware and/or software systems or devices (computing system 1000 described below with regard to FIG. 9), either implemented as part of a same provider network or system as storage nodes 410 and 420, or as part of a separate system (e.g., an external service to provider network 200 in FIG. 2, either as part of a tracking-enabled client, or a different system or device). As indicated at 450 update request(s) including tracking attributes may be sent to one or more storage nodes 410 that maintain database table 412. For example, the update requests may be sent to a master storage node, which may then replicate the updates to other storage nodes maintaining various replicas and/or partitions of database table 412 to be applied.

Secondary table index 422 may be maintained at separate storage node(s) 420, in some embodiments. Replication of attributes may be performed between storage node(s) 410 and storage node(s) 420 to update 452 secondary table index 422. Secondary table index 422 may maintain, in various embodiments, an index table containing a selection of attributes defined by database table 412. When an update 450 of an item whose attributes have been projected from database table 412, the data may be automatically propagated to the secondary table index 422. Updates 452 to replicate updates at database table 412 may flow from database table 412 (e.g., from a master node 410) to secondary index table 422 (e.g., to a master node 420). Log records or other indications of the updates at database table 412 may be sent via an asynchronous message, in some embodiments. In at least some embodiments, secondary table index 422 may project (or include the same data as in database table 412) tracking attributes, database table primary key, and/or other attributes from database table 412, so that replication of updates to these attributes may be performed when updates 450 are received.

As illustrated at 454, query responses from update trackers 430 may be received at one or multiple update trackers 430. Different update trackers 430 may, in some embodiments, be responsible for processing updates to different portions of database table 412 (e.g., according to bucket identifier and/or sequence number). In at least some embodiments, update trackers may implement update filter(s) 432, such as bloom filter(s) to identify which update listener(s) 440, such as update listener 440a, 440b, 440c, and 440d, to provide update notifications 456 to (as discussed below with regard to FIG. 7). The update listener(s) 440 may themselves publish update notifications 458 to different update consumers. Update listener(s) may perform the same or different operations to aggregate, analyze, or otherwise publish update notifications received from update tracker(s) 430, such as discussed below with regard to FIG. 8.

Figure 5:
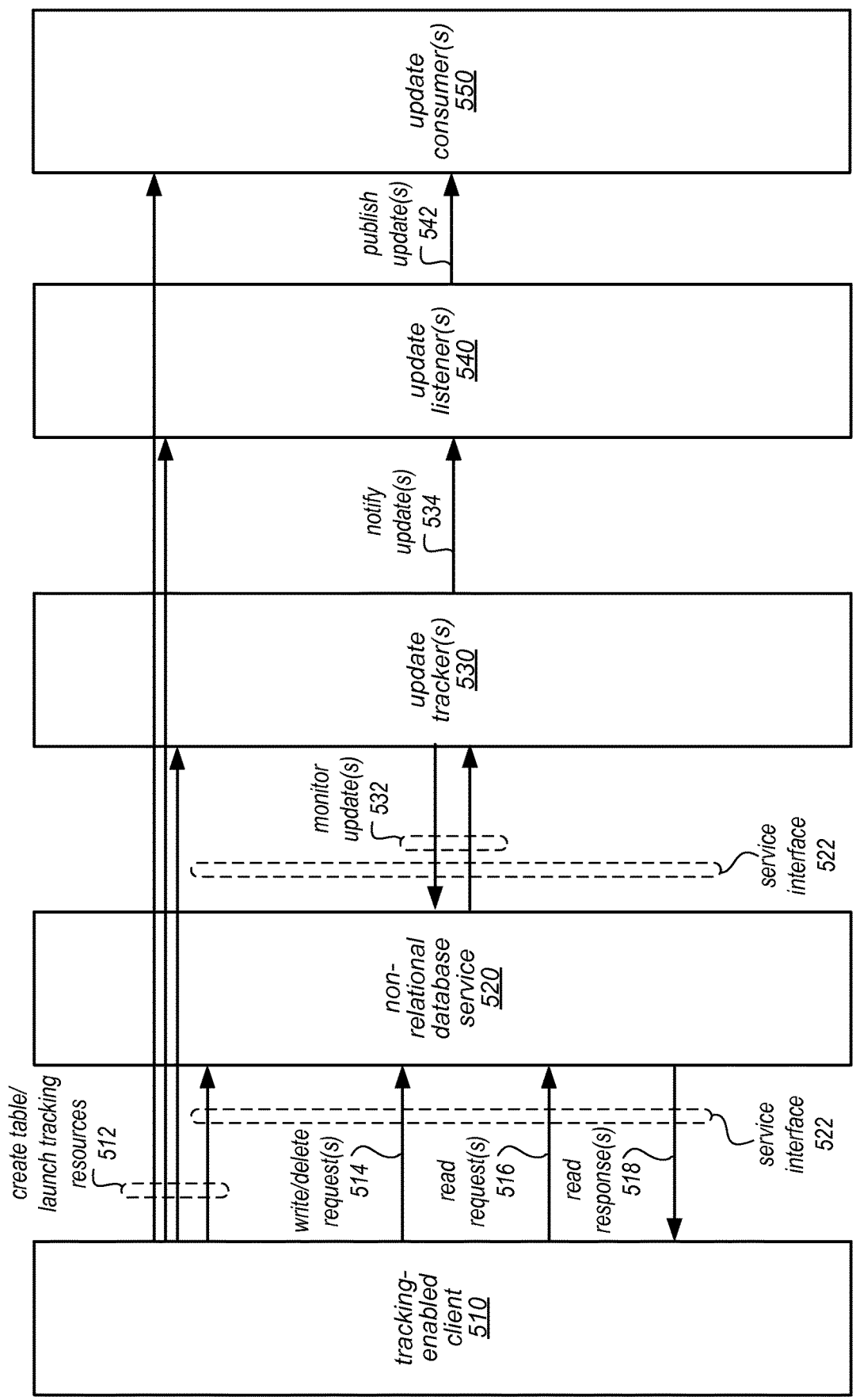
FIG. 5 is a block diagram illustrating various interactions among a tracking enabled client, non-relational database service, update trackers, update listeners, and update consumers, according to some embodiments.

FIG. 5 is a block diagram illustrating various interactions among a tracking enabled client, non-relational database service, update trackers, update listeners, and update consumers, according to some embodiments. As discussed above with regard to FIG. 4, update tracker(s) 530, update listener(s) 540, and update consumer(s) 550 may be implemented to handle update notifications (or data obtained as a result of update notifications) in many different ways. Update tracker(s) 530 monitor update(s) 532 to a database by polling non-relational database service 520 to access the secondary index for the database. In at least some embodiments, the queries to monitor the secondary index may be formatted according to service interface 522 (e.g., a programmatic interface such as an Application Programming Interface (API)) for non-relational database service 520. Update tracker(s) may then notify update(s) 534 to update listener(s), which in turn may publish update(s) 542 to update consumer(s) 550.

A tracking-enabled client 510 may be configured to perform various requests, commands, and other operations to other resources, such as non-relational database service 520, update tracker(s) 530, update listener(s) 540, and/or update consumer(s) 550, in various embodiments. For example, in at least some embodiments, tracking-enabled client 510 may be configured to send one or more requests to create a new database table (or instantiate a new database) and launch/provision/instantiate the respective tracking resources 512. As illustrated in FIG. 5, launching resources may simply be sending an indication to the resource to be aware or ready for update notifications. Launching tracking resources 512 may involve configuring the tracking resources, such as establishing policies or settings for monitoring updates, registering different update listeners(s) 540, establishing notification publication policies, and or setting up the update consumer(s) 55 (e.g., provisioning a storage object or volume to store the update notifications). In some embodiments, these various requests may be performed according to respective interfaces for network-based services, such as those offered by provider network 200 in FIG. 2, in order to provision the different tracking resources in those respective network-based services. In at least some embodiments, once provisioned, resources such as update tracker(s) 530, update listener(s) 540, and/or update consumer(s) 550 may persistently maintain, track, and/or consume updates to the database in non-relational database service 520, such as after tracking-enabled client 510 is no longer actively updating the database (e.g., client shutdown/failure/disabled), or when a different tracking-enabled client performs updates to the database.

Tracking-enabled client 510 may also interact with non-relation database service 520 to perform various requests that implement scalable tracking for database updates according to a secondary index. For example, when creating a new table 512, the request may include requests to create a secondary index based upon certain tracking attributes (e.g., a bucket identifier as a hash key, and a sequence number as a range key). Tracking-enabled client may perform various write/delete requests 514 (e.g., update, insert, add, modify, batch update, etc.) which may trigger the insertion of tracking attributes (as discussed above with regard to FIGS. 1 and 4, and below with regard to FIG. 6). Tracking-enabled client 510 may also issue read requests 516 (e.g., queries for particular data) and may parse responses 518 in such a way as to hide tracking attributes (or data maintained for tracking purposes) from an application that issued the read request 516. For example, as discussed below with regard to FIG. 7, in some embodiments, soft deletes (or other updates that remove data) may be implemented so that the update may be replicated to the secondary index, update tracker(s) 530, and update listener(s) 540. The deleted portion of data may be marked for deletion, and if returned to tracking-enabled client 510 in a read response 518, tracking-enabled client 510 may filter out the soft deleted data before providing read results.

Figure 6:
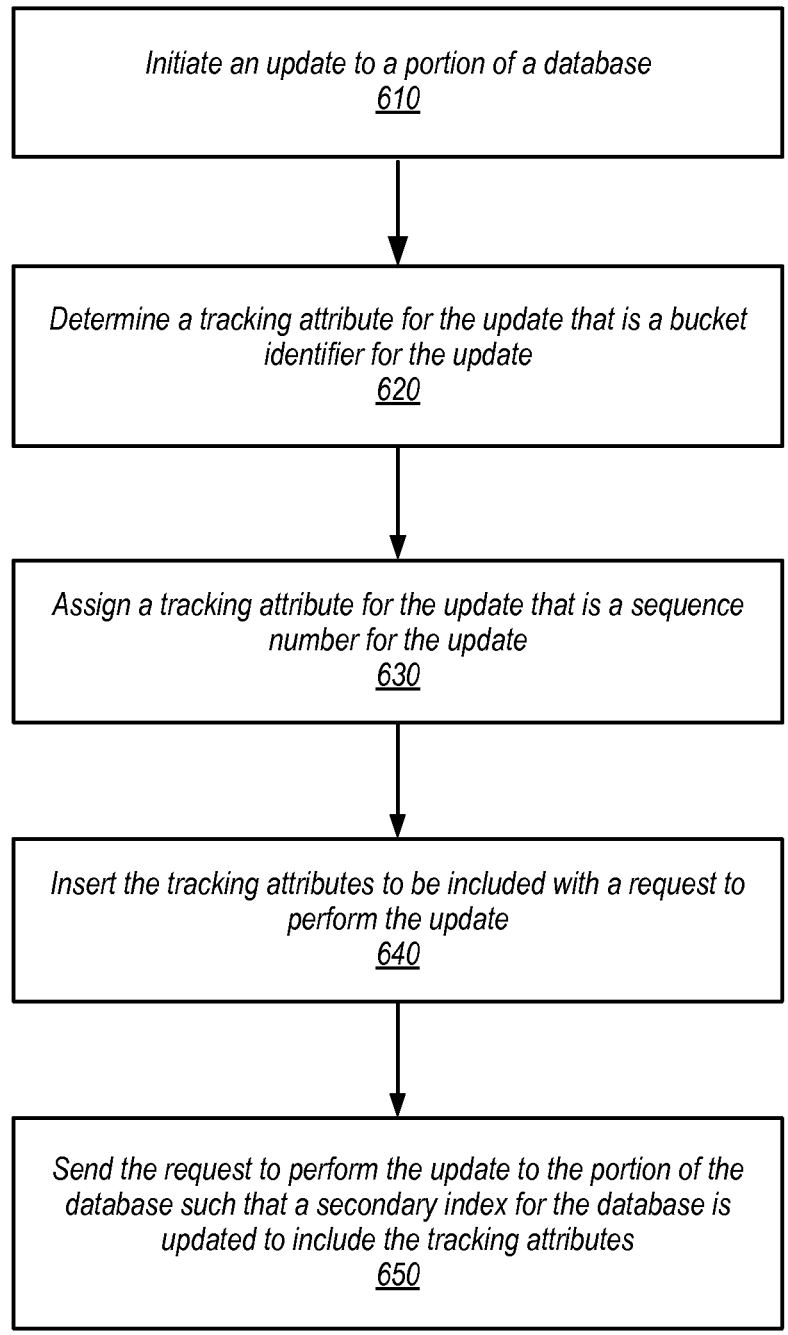
FIG. 6 is a high-level flowchart illustrating various methods and techniques for including tracking attributes in update requests to update portions of a database, according to some embodiments.

The examples of providing scalable tracking for database updates according to a secondary index in FIGS. 2-5 have been given in regard to a provider network implementing a non-relational database service. However, various other types of databases that may be implemented as separate or standalone distributed databases may implement scalable tracking for database updates according to a secondary index whether relational or non-relational in scheme. FIG. 6 is a high-level flowchart illustrating various methods and techniques for including tracking attributes in update requests to update portions of a database, according to some embodiments. These techniques may be implemented using databases as described above with regard to FIGS. 2-5, as well as other databases and/or different implementations of a tracking-enabled database client, update tracker, and/or update listener for providing scalable tracking for database updates according to a secondary index, and thus the following discussion is not intended to be limiting as to the other types or configurations of databases that may implement the described techniques. Similarly, although the term database system or service is regularly used throughout the description of FIGS. 6-8, a structured data store may also be used to implement the various techniques and methods described below, such as various types of caching storage services, or other data stores that implement a structure for data storage and may provide a secondary index so that scalable tracking for database updates may be implemented. Thus, the term database system is not intended to be limiting as to other types of structured data stores performing the various techniques discussed below.

As indicated at 610, an update to a portion of a database may be initiated. A portion of data in a database may depend upon the structure or schema of the database (e.g., records, items, objects, etc. . . . ). For example, a tracking-enabled database client may receive a request from another application implemented at the tracking-enabled database client to perform one or more database operations, including one or more updates. For those initiated update requests, tracking attributes may be generated to be included in the update request sent to the database. For instance, as indicated at 630, a tracking attribute for the update may be determined that is a bucket identifier for the update, in at least some embodiments. Buckets may be implemented for the database to label, categorize, identify, organize, or otherwise group updates together. Buckets may, for example, identify a similar type of data updated (e.g., profile data changes) or a similar type of action performed with respect to the data (e.g., a number of "clicks" on a particular HTTP link). A bucket identifier may be determined according to a bucket identifier policy, or other heuristic, for applying bucket identifiers to group updates in particular (or predictable) ways. For example, the portion of data updated by the initiated update may indicate the bucket identifier (e.g., "Update 'click-count' For 'webpage1' to ='27321'" may be mapped to bucket identifier="page clicks" and "Update 'click-count' For 'webpage2' to ='28446'" may also be mapped to bucket identifier="page clicks"). In at least some embodiments, bucket identifier mappings, heuristics, and/or policies may be shared with update trackers and update listeners in order to evaluate the data grouped within a particular bucket identifier. In some embodiments, a single bucket identifier may be applied to an update.

As indicated at 630, a tracking attribute may be assigned to an update that is a sequence number for the update. For example, in various embodiments, a timestamp (indicating the time update requests are sent) may be included as a tracking attribute. Similarly, a monotonically increasing number may be utilized as a sequence number. The sequence numbers for updates may be used to determine an order of performance of the updates at the database (e.g., allowing a reconstruction, replay, and/or log of updates to the database to be generated). In at least some embodiments, a nonce may be generated and included as a tracking attribute in an update request. A nonce may be randomly unique number which may be included to identify/differentiate a specific update. For instance, if a number of updates are sent, each of which pertain to the same portion of the database, then it may be difficult to distinguish one update from another. Comparing nonce values may be able to distinguish different updates that may be otherwise similar.

As indicated at 640, the tracking attributes (or single tracking attribute) may be included with a request to perform the update. For example, the update request may perform one of various operations to add, modify, or delete data from the portion of data. Inserting the tracking attributes may include a request to insert or add the tracking attributes with respect to the portion of data to be updated by the request (e.g., add the tracking attributes as additional attributes to an item in a non-relational database, or update values in corresponding fields for a record in a relational database). The request may then be sent to the database to perform the update to the portion of the data, as indicated at 650. The secondary index maintained for the database may be eventually updated to include indications of the new updates and/or the respective tracking attributes included in the request, in various embodiments.

Figure 7:
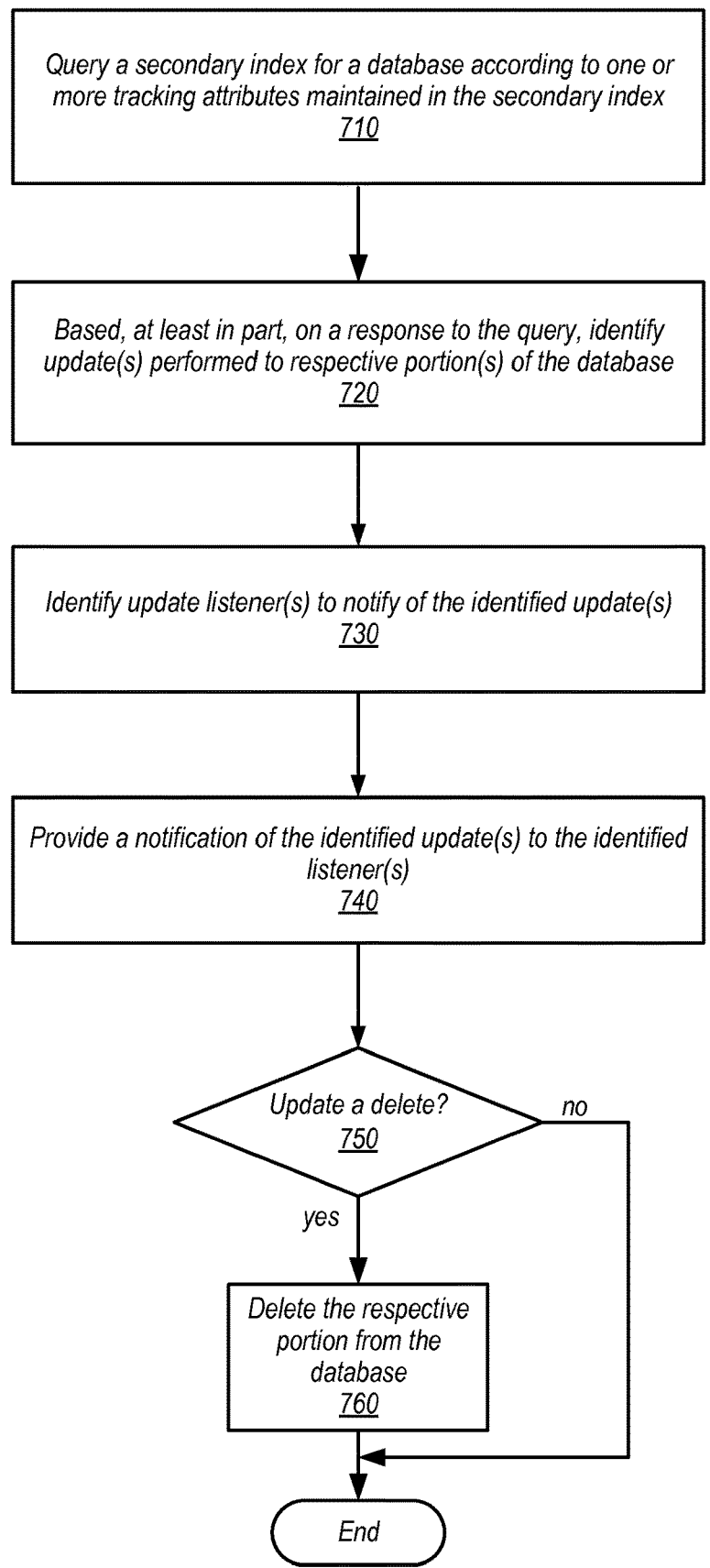
FIG. 7 is a high-level flowchart illustrating various methods and techniques for providing notifications of database updates, according to some embodiments.

Update trackers, or other systems, components, or devices, responsible for monitoring updates to the database may access the secondary index in order to identify updates and provide update notifications. FIG. 7 is a high-level flowchart illustrating various methods and techniques for providing notifications of database updates, according to some embodiments. As indicated at 710, a secondary index maintained for a database may be queried according to one or more tracking attributes maintained in the secondary index, in various embodiments. For instance, a query requesting updates to portions of the database labeled according to a particular bucket identifier may be sent. The returned updates from the secondary index may all pertain to portions of data (e.g., records, items, objects, etc.) in which the same bucket identifier was inserted (as discussed above with regard to FIG. 6). In another example, updates may be retrieved according to the tracking attribute, the sequence number for the updates, in various embodiments. For instance, a query may be sent to obtain a specified range of updates according to updates with sequence numbers within the specified range.

As indicated at 720, based, at least in part, on a response to the query, update(s) performed to respective portion(s) of the database may be identified, in various embodiments. For example, the query may return indications of updates performed to the same portion of data (e.g., record, item, or object), or multiple different portions of data. The query response may include indications of the actual change (e.g., the insert, update, write, delete, or modification of values) or may simply indicate that a change occurred. Multiple tracking attributes (e.g., bucket identifiers, sequence numbers, and/or nonces) may be returned, along with other attributes projected from the database to the secondary index. In at least some embodiments, the sequence numbers may be utilized to determine an ordering for the identified updates (e.g., in order to log or replay the updates in a similar fashion as part of providing notification, discussed below with regard to element 740). Please note that various querying techniques, predicates, and/or other information may be used to identify updates indicated in the secondary index maintained for the database and thus the previous examples are not intended to be limiting.

As indicated at 730, update listener(s) may be identified, in some embodiments, to notify of the identified updates. For example, update listeners may register or subscribe to change notifications (e.g., certain types based on tracking or other attributes). In at least some embodiments, only those update listeners that have not received an update, and are supposed to receive an update, may be identified. For example, in at least some embodiments, a bloom filter (or other probabilistic data structure) may be implemented, which may indicate whether or not a particular update notification has been sent to an update listener. In some embodiments, nonce values, for instance may be included in tracking attributes inserted as part of update requests to a database. The nonce values may represent the update and, in some embodiments, the nonce values for identified updates may be evaluated with respect to the bloom filter to determine whether or not to send an update notification to an update listener. In some embodiments, caches, or other components, mechanisms, or techniques to track which update notifications have been sent to which update listeners, and thus the previous examples are not intended to be limiting.

As indicated at 740, a notification of the identified update(s) to the identified listener(s) may be provided, in various embodiments. For example, a message or other communication may be sent including information describing or indicating the update to the database. As some update listeners may only "listen" for certain kinds of updates, then a notification may only be sent to those update listeners registered for or capable of handling the identified updates.

As discussed above with regard to FIG. 5, in some embodiments, deletes, or other requests to remove data from a database may be performed softly (e.g., the data is not immediately deleted or removed from the database). Instead, a marker or other indicator (e.g., such as a tombstone marker) may be inserted as one of the tracking attributes to indicate that the respective portion of data deleted/removed by the update request is no longer visible to a tracking-enabled database client. For instance, if a tracking-enabled database client were to query for data that included the marked portion, the marked portion may be returned (along with other data portions), but the tracking-enabled client may hide/remove the marked portion of data from any results presented or utilized based the query response. In this way, the update may have time to replicate, notify, and/or publish to the secondary index, update tracker(s), and/or update listener(s) before being removed. Thus, as indicated at 750, if one of the identified updates is a delete request (or other removal of database data), then as indicated by the positive exit from 750, the respective portion marked for deletion may be deleted from the database, as indicated at 760. In this way, the update may be tracked before being removed from the database (and thus the secondary index).

Although update listeners are discussed as receiving update notifications with regard to FIG. 7, in at least some embodiments, update notifications may be provided without passing the update notifications to an update listener. For example, an update tracker, such as update tracker 430 discussed above with regard to FIG. 4, may directly send update notifications to update consumers, in some embodiments.

Multiple update trackers may be implemented, in various embodiments, to scale the resources available to process updates to the database (without creating a single update processing bottleneck). For instance, in some embodiments, different update trackers may identify updates for different buckets (e.g., only sending queries for updates according to a particular bucket identifier). In this way, the processing of updates for different types of data labeled or recognized according to particular bucket identifiers may process independently and/or in parallel. Multiple update trackers may be used to process different ranges of updates according to sequence numbers of updates, in some embodiments. For example, one update tracker may process and handle the first 10 updates, while a second update tracker may process and handled the second 10 updates, and so on. A coordinator, or other update tracker management component, may be configured to assign particular ranges of updates to process to particular update trackers, in some embodiments.

The number and types of update consumers for a database may vary. Moreover, update consumers may apply update notifications in different ways. For example, some update consumers may store update notifications in order to implement a log, archive, and/or database recovery service. In at least some embodiments, the update notifications may be provided to systems that are performing database replication (e.g., to apply the updates to a database replica which may be unable to directly communicate with the database). In other examples, the update notifications may be used to analyze, manage, or otherwise operate an application or server (e.g., implemented among multiple network-based services in a provider network, as discussed above with regard to FIG. 2). In at least some embodiments, another index or data structure for the database may be generated by applying the updates, providing a means to generate multiple different index structures without slowing down the performance of updates to the database.

Figure 8:
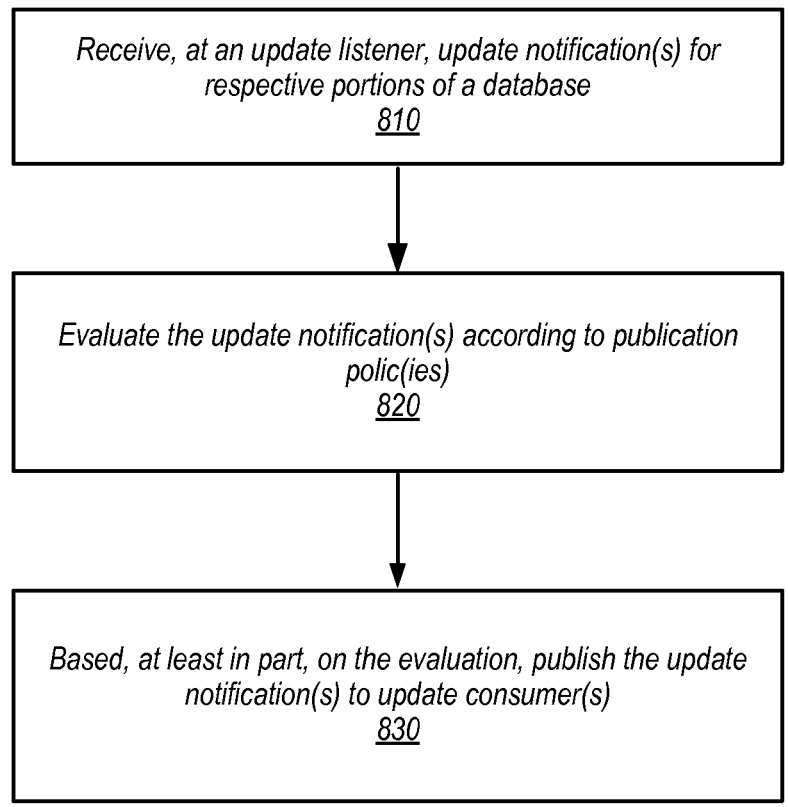
FIG. 8 is a high-level flowchart illustrating various methods and techniques for publishing updates to a database at an update listener, according to some embodiments.

For scenarios where multiple update consumers may wish to be apprised of database updates, the burden on any one system to supply update notifications may prove too great. Moreover, interfacing with different systems and performing different operations or analyses on the update notifications may render the performance of a single system to be less efficient that if it were optimized for a particular update consumer. Thus, in at least some embodiments, update listeners, such as update listeners 440 and 540 discussed above with regard to FIGS. 4 and 5) may be implemented to handle update notifications for a particular one (or multiple ones) of update consumers for update notifications to a database. FIG. 8 is a high-level flowchart illustrating various methods and techniques for publishing updates to a database at an update listener, according to some embodiments.

As indicated at 810, update notification(s) for respective portions of a database may be received at an update listener, in various embodiments. For example, an update listener may register or establish an update feed/stream from an update tracker (such as update trackers 430 and 530 discussed above in FIGS. 4 and 5). In at least some embodiments, multiple update trackers may be implemented to process and obtain updates to different buckets identified for the database. Thus, an update listener may register or establish an update feed/stream with particular update trackers. For example, the update listener may publish certain types of update notifications (e.g., updates which may indicate errors or otherwise trigger certain actions) and thus may receive only those update notifications relevant to publishing the type of update notifications that trigger the actions.

As indicated at 820, the received update notification(s) may be evaluated according publication polic(ies) for the update listener, in some embodiments. For instance, a publication policy may specify the update consumer (e.g., storage, streaming service, event handler, cache, replicator, etc. . . . ) as well as the type of updates and or data to be provided to the update consumers. For example, a publication policy may identify certain data projected into the secondary index (which may be included in an update notification or may need to be obtained from the secondary index by the update listener). Publication polic(ies) may, in some embodiments, describe/prescribe certain analysis, modification, aggregation, or other manipulation of update notifications prior to publication. For example, instead of publishing a raw number of updates to a certain value (e.g., total number of thread comments), a publication policy may describe summing or aggregating additions to a previously published value, which the update listener may periodically publish to a particular update consumer. Publication policies may generally describe the various input data concerning database updates, operations on the data concerning database updates, and output data to be published concerning the database updates, in addition to the various systems, components, and/or devices from which the data may be obtained and to which the data may be provided.

As indicated at 830, based, at least in part, on the evaluation, publish the update notification(s) to update consumer(s), in at least some embodiments. The evaluation of the publication policy, as noted earlier, may describe the data to be obtained, operations to be performed with the data, and the destination of the data, the update consumer(s). Accordingly, the change notification(s) published to the update consumer(s) may be performed in various ways. For example, for an update consumer that is implemented as part of another network-based service, network messaging and protocol may be utilized to send the change notifications to the update consumer in the network-based service as may be determined based on the evaluation of the publication policy for the update listener. For local, or update consumers that may reached differently, a corresponding protocol, communication technique, and/or other medium may be utilized to publish the update notification(s) to update consumer(s). Please note that the use of publication policies discussed above is merely provided as an example of an implementation of an update listener. Similar techniques may be accomplished by hardcoding or hardwiring the various elements described above (in addition to other steps and/or transformations), and thus the previous example of handling update notifications at an update listener is not intended to be limiting.

The methods described herein may in various embodiments be implemented by any combination of hardware and software. For example, in one embodiment, the methods may be implemented by a computer system (e.g., a computer system as in FIG. 9) that includes one or more processors executing program instructions stored on a computer-readable storage medium coupled to the processors. The program instructions may be configured to implement the functionality described herein (e.g., the functionality of various servers and other components that implement the structured data store services/systems and/or delegation services/systems described herein). The various methods as illustrated in the figures and described herein represent example embodiments of methods. The order of any method may be changed, and various elements may be added, reordered, combined, omitted, modified, etc.

Figure 9:
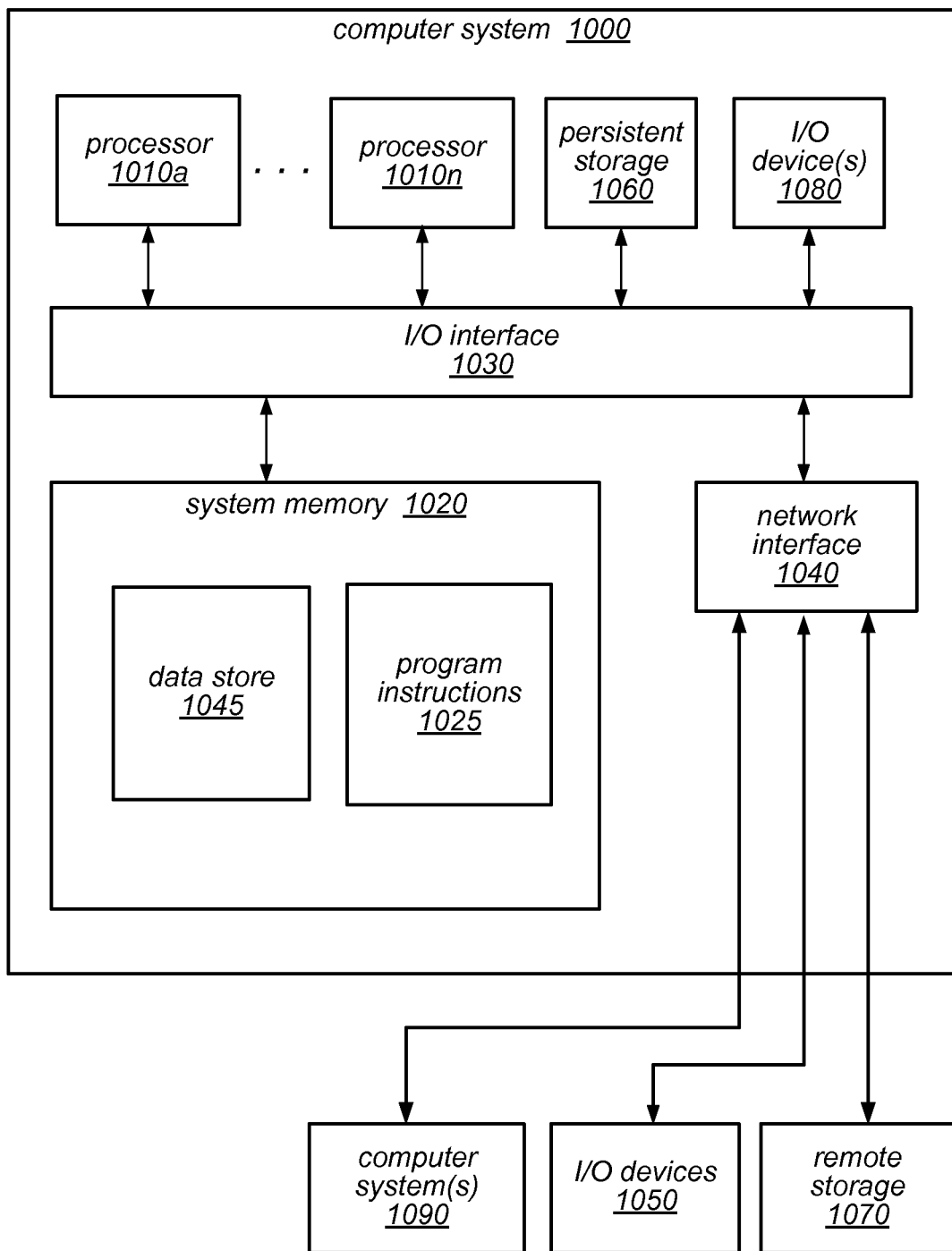
FIG. 9 a block diagram illustrating an example computing system, according to some embodiments.

Embodiments of scalable tracking of database updates according to a secondary index as described herein may be executed on one or more computer systems, which may interact with various other devices. FIG. 9 is a block diagram illustrating an example computer system, according to various embodiments. For example, computer system 1000 may be configured to implement nodes of a delegation service, a structured data store, and/or a client, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the systems described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a database service, tracking-enabled client, update tracker, update listener, and/or update consumer in different embodiments. In some embodiments, program instructions 1025 may implement multiple separate clients, server nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. In general, system memory 1020 (e.g., data store 1045 within system memory 1020), persistent storage 1060, and/or remote storage 1070 may store data blocks, replicas of data blocks, metadata associated with data blocks and/or their state, configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090 (which may implement one or more storage system server nodes, database engine head nodes, and/or clients of the database systems described herein), for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 9 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations. though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:
1. A system, comprising:
one or more processors;
a memory, comprising program instructions that cause the one or more processors to implement:
a tracking-enabled database client that provides an application access to a database, the tracking-enabled database client configured to:
for individual ones of a plurality of requests that are received from the application to update respective portions of a table of the database:
generate a plurality of tracking attributes to include in the individual ones of the plurality of requests, wherein the plurality of tracking attributes comprise a respective sequence number for the individual ones of the plurality of requests and a respective bucket identifier for the respective portions of the database to be updated;
modify the plurality of requests to update the respective portions of the table of the database to cause the database to insert the plurality of tracking attributes into the respective portions of the table of the database in addition to the updates received from the application;
send to the database the plurality of modified requests to update the respective portions of the table of the database, wherein the plurality of tracking attributes included in the individual ones of the plurality of requests are inserted into the respective portions of the table of the database as part of performing the plurality of modified requests at the database to update the respective portions in order to be replicated to a secondary index maintained for the database, wherein the secondary index maintained for the database indicates the respective portions of the database updated according to the plurality of requests;
one or more update trackers for the database, respectively configured to:
query the secondary index maintained for the database according to at least one of the one or more tracking attributes to identify one or more updates to one or more of the respective portions of the table of the database performed as a part of the plurality of requests, wherein an ordering of the identified one or more updates to the one or more respective portions of the database is determined according to the respective sequence number for the identified one or more updates; and
provide one or more notifications for the one or more identified updates.

2. The system of claim 1, wherein the at least one tracking attribute for querying the secondary index includes the respective bucket identifier.

3. The system of claim 1, wherein the one or more update trackers are a plurality of update trackers, and wherein the respective bucket identifier for the query of the secondary index is a different respective bucket identifier for individual ones of the plurality of update trackers.

4. The system of claim 1, wherein the database is implemented as part of a network-based database service, and wherein the send of the plurality of requests and the query of the secondary index is performed via a programmatic interface for the network-based database service.

5. A method, comprising:
performing, by one or more computing devices:
for individual ones of a plurality of requests that are received from an application to update respective portions of a table of a database:
modifying the plurality of requests to update the respective portions of the database to cause the database to insert one or more tracking attributes into the respective portions of the table of the database in addition to the updates received from the application, wherein the one or more tracking attributes comprise a respective sequence number for the individual ones of the plurality of requests;
sending to the database the plurality of modified requests to update the respective portions of the table of the database to be performed, wherein the one or more tracking attributes included in the individual ones of the plurality of requests are inserted into the respective portions of the database as part of performing the plurality of modified requests at the database to the update the respective portions in order to be replicated to a secondary index maintained for the database, wherein the secondary index maintained for the database indicates the respective portions of the database updated according to the plurality of requests;
querying the secondary index maintained for the database according to at least one of the one or more tracking attributes to identify one or more updates to one or more of the respective portions of the table of the database performed as a part of the plurality of requests, wherein an ordering of the identified one or more updates to the one or more respective portions of the database is determined according to the respective sequence number for the identified one or more updates; and providing one or more notifications for the one or more identified updates.

6. The method of claim 5, wherein modifying the plurality of requests to update the respective portions of the database to cause the database to insert one or more tracking attributes into the respective portions of the database in addition to the updates received from the application comprises determining a respective bucket identifier for the individual ones of the plurality of requests to include as one of the one or more tracking attributes, and wherein the at least one tracking attribute for querying the secondary index includes the respective bucket identifier.

7. The method of claim 6, wherein the identified one or more updates to the one or more respective portions of the database include the same respective bucket identifier.

8. The method of claim 6, wherein modifying the plurality of requests to update the respective portions of the database to cause the database to insert the one or more tracking attributes into the respective portions of the database in addition to the updates received from the application and sending the plurality of modified requests are performed by a tracking-enabled client of the database, wherein querying the secondary index and providing the one or more notifications are performed by a plurality of update trackers for the database, and wherein the respective bucket identifier for querying the secondary index is a different respective bucket identifier for individual ones of the plurality of update trackers.

9. The method of claim 5, wherein the one or more notifications for the one or more identified updates are provided to one or more different update listeners, and wherein the method further comprises:
publishing, by the one or more different update listeners, the one or more notifications to a respective one of one or more different update consumers.

10. The method of claim 9, wherein modifying the plurality of requests to update the respective portions of the table of the database to cause the database to insert the one or more tracking attributes into the respective portions of the table of the database in addition to the updates received from the application and sending the plurality of modified requests are performed by a tracking-enabled client of the database, wherein querying the secondary index and providing the one or more notifications are performed one or more update trackers for the database, and wherein the method further comprises:
launching the one or more update trackers and the one or more different update listeners as part of a table creation request performed at the tracking-enabled client of the database.

11. The method of claim 5, wherein at least one of the plurality of requests is a delete request to delete the respective portion of the database, wherein the delete request is formatted as a soft delete such that the respective portion of the database is marked for deletion when the updated request is performed at the database, and wherein the method further comprises:
in response to providing the one or more notifications for the identified one or more respective portions of the database to be updated, sending a request to the database to remove the respective portion of the database marked for deletion, wherein the delete request is included in the identified one or more updates.

12. The method of claim 5, further comprising:
based, at least in part, on the one or more notifications of the identified one or more updates, triggering an event at one or more update consumers.

13. The method of claim 5, wherein the database is a non-relational database.

14. A non-transitory, computer-readable storage medium, storing program instructions that when executed by one or more computing devices cause the one or more computing devices to implement:
for individual ones of a plurality of requests that are received from an application to update respective portions of a table of a database:
generating a plurality of tracking attributes to include in the individual ones of the plurality of requests, wherein the plurality of tracking attributes comprise a respective sequence number for the individual ones of the plurality of requests and a respective bucket identifier for the respective portions of the database to be updated;
modifying the plurality of requests to update the respective portions of the table of the database to cause the database to insert the plurality of tracking attributes into the respective portions of the database in addition to the updates received from the application;
sending to the database the plurality of modified requests to update the respective portions of the table of the database to be performed, wherein the plurality of tracking attributes included in the individual ones of the plurality of requests are inserted into the respective portions of the database as part of performing the plurality of modified requests at the database in order to be replicated to a secondary index maintained for the database, wherein the secondary index maintained for the database indicates the respective portions of the database updated according to the plurality of requests;
querying the secondary index maintained for the database according to at least one of the one or more tracking attributes to identify one or more updates to one or more of the respective portions of the database performed as a part of the plurality of requests, wherein an ordering of the identified one or more updates to the one or more respective portions of the database is determined according to the respective sequence number for the identified one or more updates; and
providing one or more notifications for the one or more identified updates.

15. The non-transitory, computer-readable storage medium of claim 14, wherein the at least one tracking attribute for querying the secondary index includes the respective bucket identifier.

16. The non-transitory, computer-readable storage medium of claim 14, wherein the one or more notifications for the one or more identified updates are provided to one or more different update listeners, and wherein the program instructions further cause the one or more computing devices to implement:
publishing, by the one or more different update listeners, the one or more notifications to a respective one of one or more different update consumers.

17. The non-transitory, computer-readable storage medium of claim 16, wherein the plurality of tracking attributes to include in the individual ones of the plurality of requests further comprises a respective nonce, and wherein, in providing the one or more notifications for the one or more identified updates, the program instructions cause the one or more computing devices to implement:
evaluating the respective nonce for the identified one or more updates according to a bloom filter to identify the one or more different update listeners to provide the one or more notifications.

18. The non-transitory, computer-readable storage medium of claim 14, wherein modifying the plurality of requests to update the respective portions of the table of the database to cause the database to insert the one or more tracking attributes into the respective portions of the database in addition to the updates received from the application and sending the plurality of modified requests are performed by a tracking-enabled client of the database, wherein querying the secondary index and providing the one or more notifications are performed by a plurality of update trackers for the database, and wherein the respective bucket identifier for querying the secondary index is a different respective bucket identifier for individual ones of the plurality of update trackers.

19. The non-transitory, computer-readable storage medium of claim 14, wherein the program instructions cause the one or more computing devices to further implement:
based, at least in part, on the one or more notifications of the identified one or more updates, applying the identified one or more updates to update a replica of the database.

20. The non-transitory, computer-readable storage medium of claim 14, wherein the program instructions cause the one or more computing devices to further implement:
based, at least in part, on the one or more notifications of the identified one or more updates, applying the identified one or more updates to generate an index for the database.

* * * * *